United States Patent
Sugiyama et al.

(10) Patent No.: US 9,454,233 B2
(45) Date of Patent: Sep. 27, 2016

(54) NON-TRANSITORY COMPUTER READABLE MEDIUM

(71) Applicant: FUJI XEROX CO., LTD., Minato-ku, Tokyo (JP)

(72) Inventors: Miaki Sugiyama, Kanagawa (JP); Ritsuko Akao, Kanagawa (JP); Daisuke Yasuoka, Kanagawa (JP); Yoshio Hasegawa, Kanagawa (JP); Yuki Shimizu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 33 days.

(21) Appl. No.: 14/260,978

(22) Filed: Apr. 24, 2014

(65) Prior Publication Data

US 2015/0160732 A1 Jun. 11, 2015

(30) Foreign Application Priority Data

Dec. 5, 2013 (JP) .................................. 2013-251906

(51) Int. Cl.
| | |
|---|---|
| *G06F 3/041* | (2006.01) |
| *G06F 3/01* | (2006.01) |
| *G06F 3/0488* | (2013.01) |
| *G06F 3/0482* | (2013.01) |
| *G06F 9/44* | (2006.01) |

(52) U.S. Cl.
CPC ............ *G06F 3/017* (2013.01); *G06F 3/0482* (2013.01); *G06F 3/0488* (2013.01); *G06F 9/4446* (2013.01)

(58) Field of Classification Search
None
See application file for complete search history.

(56) References Cited

U.S. PATENT DOCUMENTS

| | | | |
|---|---|---|---|
| 8,947,355 B1* | 2/2015 | Karakotsios | G09G 5/08 345/156 |
| 2009/0303204 A1* | 12/2009 | Nasiri | A63F 13/06 345/184 |
| 2010/0333044 A1* | 12/2010 | Kethireddy | G06F 3/0481 715/863 |
| 2015/0121217 A1* | 4/2015 | O'Donoghue | G06F 3/0484 715/708 |

FOREIGN PATENT DOCUMENTS

| | | |
|---|---|---|
| JP | 09-134249 A | 5/1997 |
| JP | 2011-076349 A | 4/2011 |

* cited by examiner

*Primary Examiner* — Joseph Haley
(74) *Attorney, Agent, or Firm* — Sughrue Mion, PLLC

(57) ABSTRACT

A non-transitory computer readable medium storing a program causing a computer to execute a process is provided. The process includes switching, in a case where at least one of an attitude sensing result and an acceleration sensing result relating to a portable information terminal, the portable information terminal including a touch panel, satisfies a predetermined switching condition, data of interest to a corresponding piece of data among plural pieces of data; and performing, on the data of interest, in a case where at least one of the attitude sensing result and the acceleration sensing result relating to the portable information terminal satisfies a predetermined performing condition, processing corresponding to the performing condition.

14 Claims, 9 Drawing Sheets

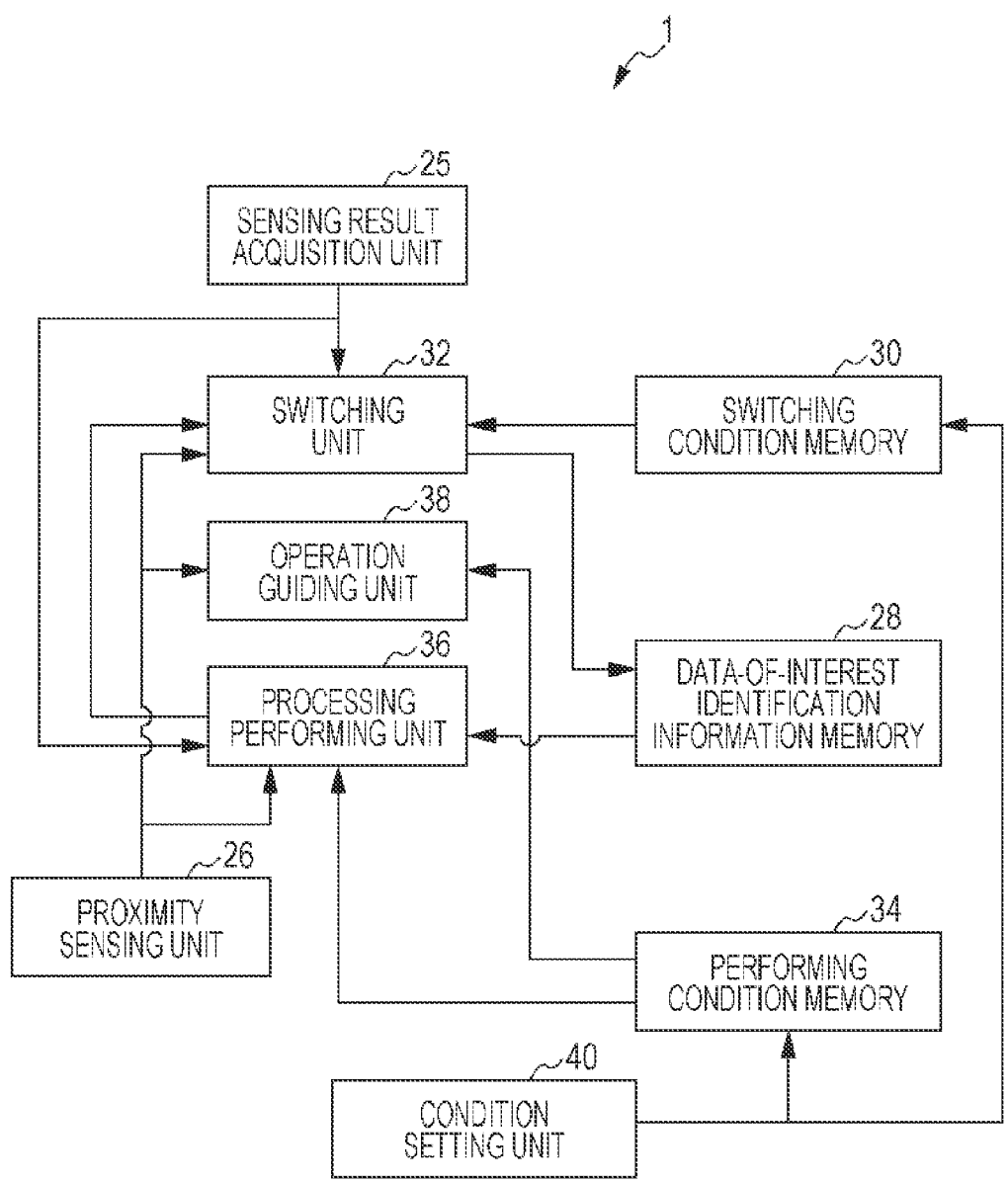

FIG. 5

| SWITCHING METHOD | SWITCHING CONDITION |
|---|---|
| SWITCHING METHOD A (SWITCH DATA OF INTEREST TO DATA ON IMMEDIATE RIGHT) | CONDITION A (PATTERN OF CHANGES IN ATTITUDE VECTOR θ SIMILAR TO PATTERN A) |
| SWITCHING METHOD B (SWITCH DATA OF INTEREST TO DATA ON IMMEDIATE LEFT) | CONDITION B (PATTERN OF CHANGES IN ATTITUDE VECTOR θ SIMILAR TO PATTERN B) |
| SWITCHING METHOD C (SWITCH DATA OF INTEREST TO DATA RIGHT ABOVE) | CONDITION C (PATTERN OF CHANGES IN ATTITUDE VECTOR θ SIMILAR TO PATTERN C) |
| SWITCHING METHOD D (SWITCH DATA OF INTEREST TO DATA RIGHT BELOW) | CONDITION D (PATTERN OF CHANGES IN ATTITUDE VECTOR θ SIMILAR TO PATTERN D) |

FIG. 6

| PROCESSING | PERFORMING CONDITION |
|---|---|
| PROCESSING A (PRINTING) | CONDITION E (PATTERN OF CHANGES IN ACCELERATION VECTOR a SIMILAR TO PATTERN E) |
| PROCESSING B (DISPLAY) | CONDITION F (PATTERN OF CHANGES IN ACCELERATION VECTOR a SIMILAR TO PATTERN F) |
| PROCESSING C (DELETION) | CONDITION G (PATTERN OF CHANGES IN ACCELERATION VECTOR a SIMILAR TO PATTERN G) |

NON-TRANSITORY COMPUTER READABLE MEDIUM

CROSS-REFERENCE TO RELATED APPLICATIONS

This application is based on and claims priority under 35 USC 119 from Japanese Patent Application No. 2013-251906 filed Dec. 5, 2013.

BACKGROUND (i) Technical Field

The present invention relates to a non-transitory computer readable medium.

(ii) Related Art

Portable information terminals including touch panels have been widely used.

SUMMARY

According to an aspect of the invention, there is provided a non-transitory computer readable medium storing a program causing a computer to execute a process. The process includes switching, in a case where at least one of an attitude sensing result and an acceleration sensing result relating to a portable information terminal, the portable information terminal including a touch panel, satisfies a predetermined switching condition, data of interest to a corresponding piece of data among plural pieces of data; and performing, on the data of interest, in a case where at least one of the attitude sensing result and the acceleration sensing result relating to the portable information terminal satisfies a predetermined performing condition, processing corresponding to the performing condition.

BRIEF DESCRIPTION OF THE DRAWINGS

An exemplary embodiment of the present invention will be described in detail based on the following figures, wherein:

FIG. 4 is a functional block diagram illustrating functional groups implemented by the portable information terminal;

FIG. 5 is a diagram illustrating an example of a switching condition table;

FIG. 6 is a diagram illustrating an example of a performing condition table.

DETAILED DESCRIPTION

An exemplary embodiment of the present invention will be described in detail below with reference to the figures.

Figure 1:
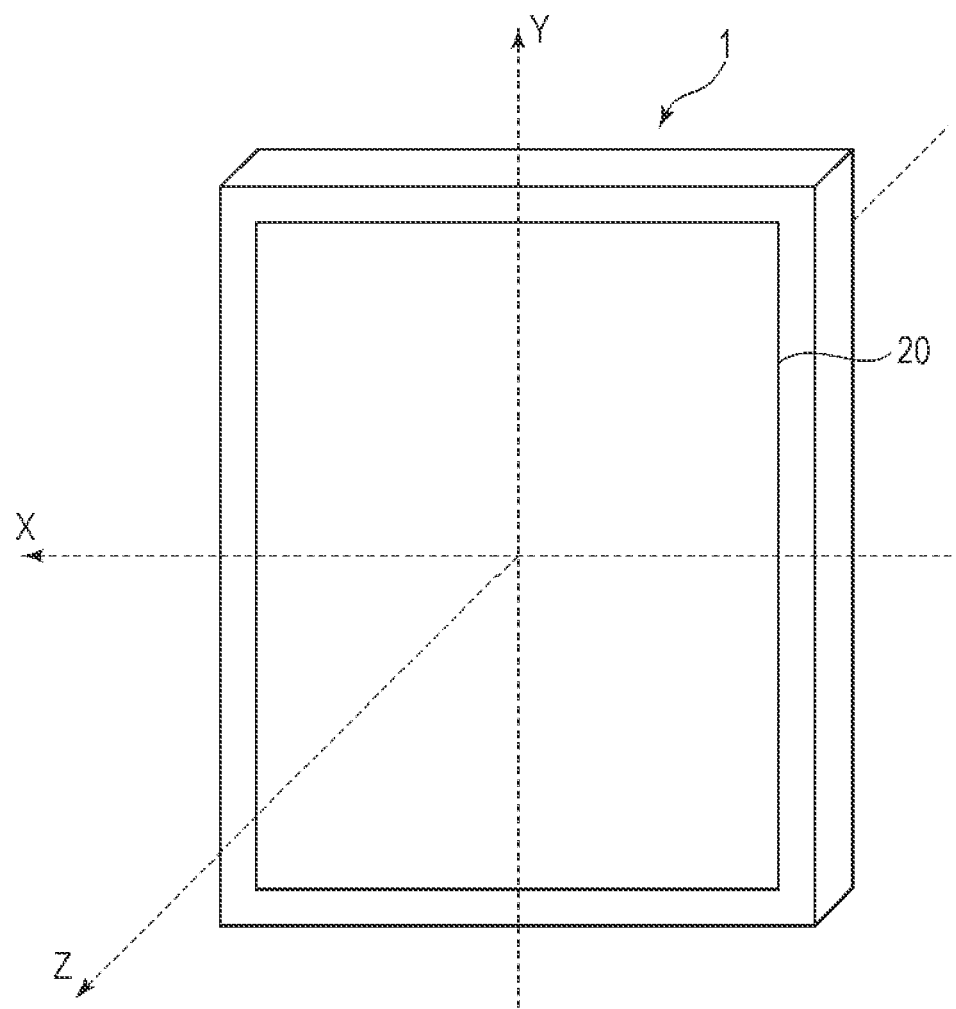
FIG. 1 is a diagram illustrating an external view of a portable information terminal according to an exemplary embodiment of the present invention.

FIG. 1 is a diagram illustrating an external view of a portable information terminal 1 according to an exemplary embodiment of the present invention. The portable information terminal 1 includes a touch panel 20, and is implemented as a tablet personal computer or a smartphone, for example. The portable information terminal 1 has three axes that are at right angles to one another, that is, an X axis, a Y axis, and a Z axis. The X axis is an axis parallel to the lateral direction of the portable information terminal 1, and the Y axis is an axis parallel to the longitudinal direction of the portable information terminal 1. The Z axis is an axis parallel to a direction normal to the touch panel 20. When the attitude of the portable information terminal 1 changes, the directions of these three axes change accordingly.

Figure 2A:
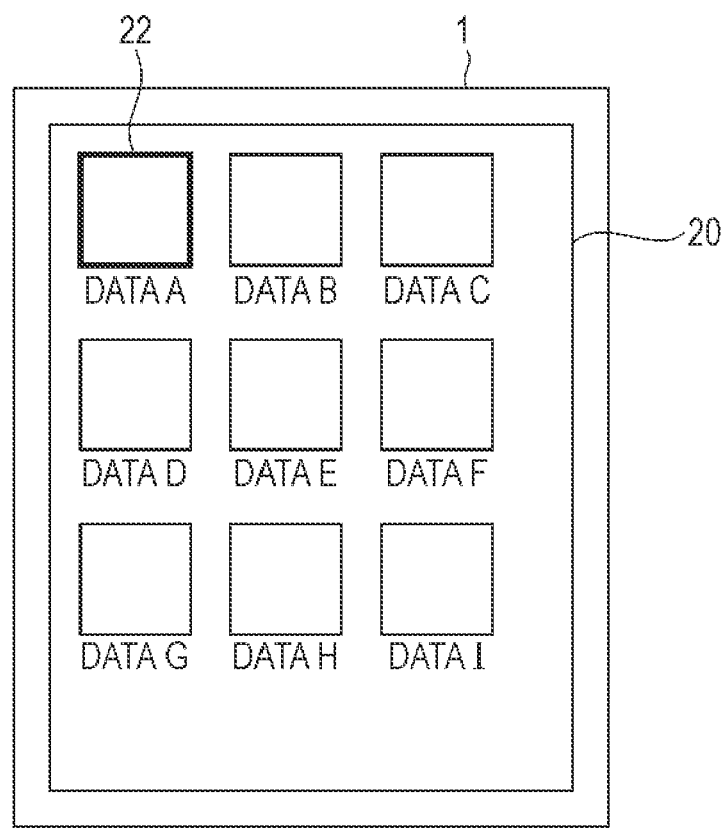
FIG. 2A is a diagram illustrating an example of a data list screen.

FIG. 2A is a diagram illustrating an example of a data list screen displayed on the touch panel 20. As illustrated in FIG. 2A, thumbnail images of plural pieces of document data stored in a folder are arranged and displayed on the data list screen. Each small square represents a thumbnail image. On the data list screen, a thumbnail image of a piece of document data that is currently selected (hereinafter referred to as data of interest) is surrounded by an indicator 22. Accordingly, data of interest may be easily known.

In order to switch the data of interest, a user usually touches the touch panel 20 in the vicinity of another thumbnail image. However, there is a case where a user (for example, a worker working in a work site) is unable to touch the touch panel 20 because the user's hand is dirty or wet, for example. In the case where detection of touch input is performed using a capacitive sensing method, for example, touching performed by a user (a person working while wearing gloves or a person having a disabling condition, for example) may not be detected because the user is wearing gloves or the user is wearing a prosthetic hand, for example.

Figure 2B:
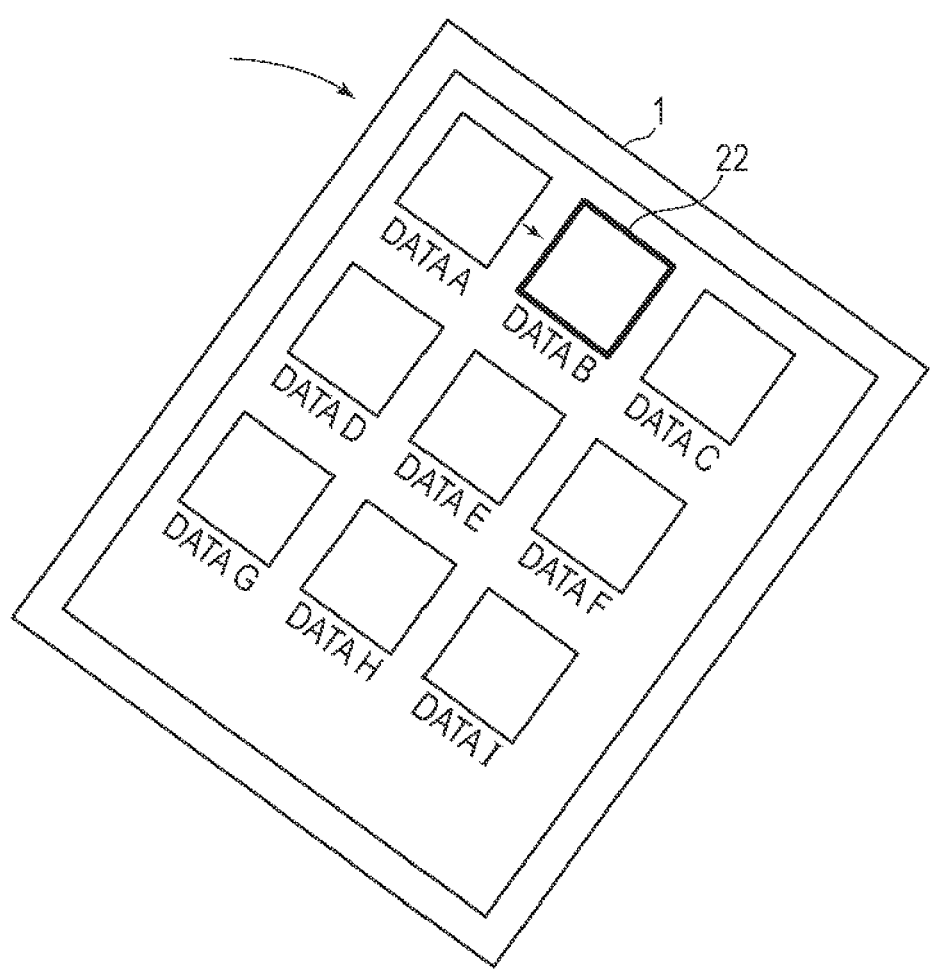
FIG. 2B is a diagram illustrating an example of a data list screen.

For such an occasion, the portable information terminal 1 is configured so that it is possible to give an instruction for switching the data of interest by moving the portable information terminal 1. In this exemplary embodiment, a user gives an instruction to switch the data of interest to the piece of document data located on the immediate right of the current data of interest by inclining the portable information terminal 1 to the right. FIG. 2B is a diagram illustrating the data list screen when the portable information terminal 1 is inclined to the right. As illustrated in FIG. 2B, the indicator 22 has moved to the piece of document data located on the immediate right of the previous data of interest, and the data of interest has been switched to the piece of document data located on the immediate right of the previous data of interest. A user gives an instruction to switch the data of interest to the piece of document data located on the immediate left of the current data of interest by inclining the portable information terminal 1 to the left. A user gives an instruction to switch the data of interest to the piece of document data located right above the current data of interest by inclining the portable information terminal 1 backward. A user gives an instruction to switch the data of interest to the piece of document data located right below the current data of interest by inclining the portable information terminal 1 forward. In this way, it is possible for a user to switch the data of interest in the portable information terminal 1 without touch input.

In order to view or print an object (here, a document) represented by the data of interest, or to delete the data of interest, a user usually touches the touch panel 20 in the vicinity of the thumbnail image of the data of interest.

However, a user may be unable to touch the touch panel 20 or touching may not be detected because of the above-described reasons.

For such an occasion, the portable information terminal 1 is configured so that it is possible to give an instruction to perform processing on the data of interest, such as deletion of the data of interest, by moving the portable information terminal 1. In this exemplary embodiment, a user gives an instruction to print a document represented by the data of interest by tapping once on the bottom side of the portable information terminal 1, and a user gives an instruction to display the document by tapping once on the right side of the portable information terminal 1. A user gives an instruction to delete the data of interest by tapping twice on the right side of the portable information terminal 1. Since deletion processing is processing that is to be performed more carefully than other processing, the number of times of tapping requested for deletion is more than that requested for printing or display. As described above, a user is able to give an instruction to perform processing on the data of interest without touch input.

Figure 2C:
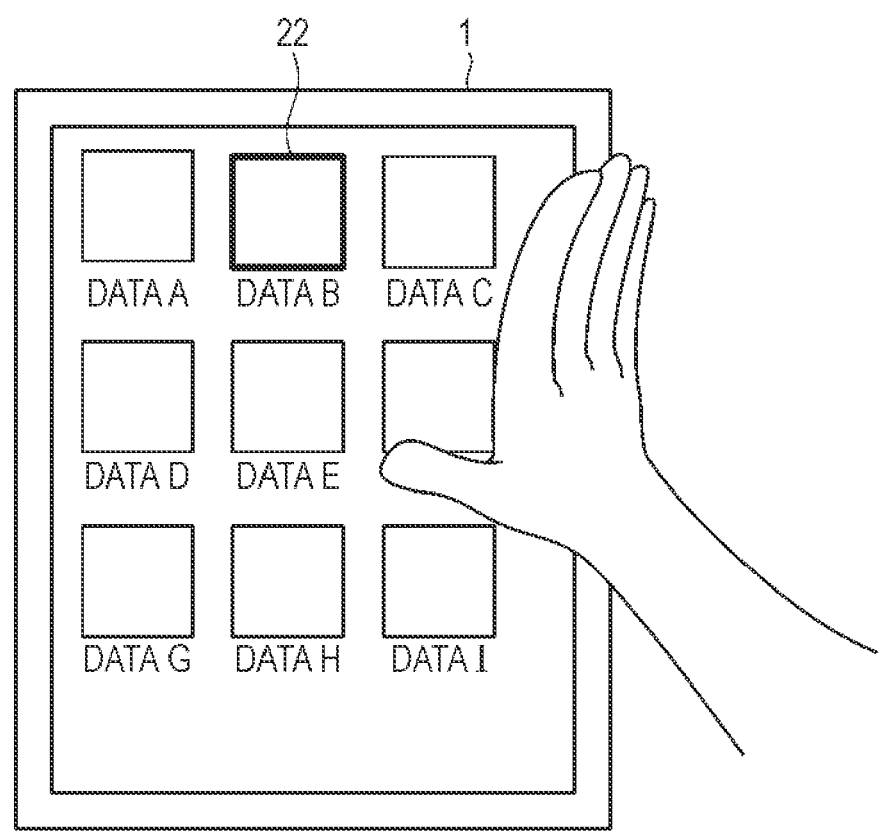
FIG. 2C is a diagram illustrating a state in which a user puts his/her hand close to a touch panel.
Figure 2D:
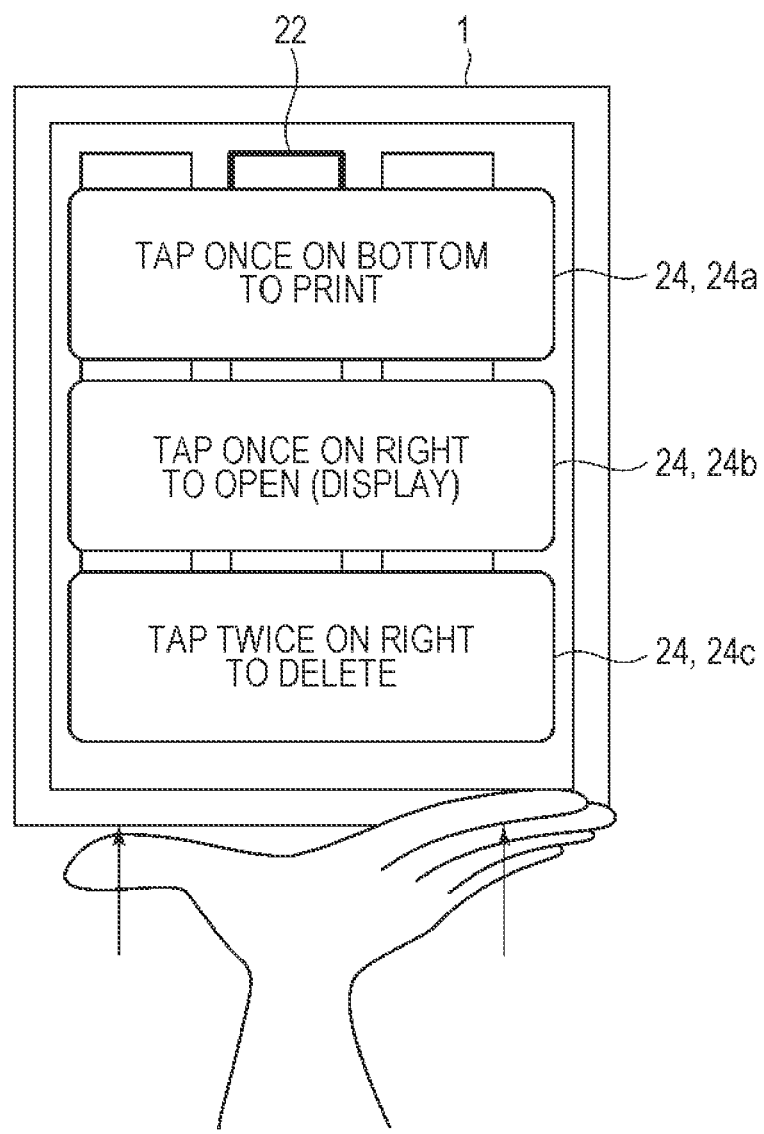
FIG. 2D is a diagram illustrating an example of a data list screen.

A user may perform, by mistake, an operation for giving an instruction to perform processing. For example, an operation for giving an instruction to perform processing may accidentally be performed just when a user is about to carry the portable information terminal 1. For such an occasion, the portable information terminal 1 gives guidance on an operation for giving an instruction to perform processing, by using an image or sound. In this way, the portable information terminal 1 gives a reminder to a user so that an operation for giving an instruction to perform processing will not be performed by mistake. Specifically, when a user puts his/her hand close to the touch panel 20, a guidance image 24 is displayed for each of printing, display, and deletion, which gives guidance on an operation for giving an instruction to perform each of printing, display, and deletion. FIG. 2C is a diagram illustrating a state in which a user puts his/her hand close to the touch panel 20, and FIG. 2D is a diagram illustrating the data list screen when a user puts his/her hand close to the touch panel 20. As illustrated in FIG. 2D, a guidance image 24a that gives guidance on an operation for giving an instruction to perform printing, a guidance image 24b that gives guidance on an operation for giving an instruction to perform display, and a guidance image 24c that gives guidance on an operation for giving an instruction to perform deletion are displayed. In FIG. 2D, a user taps once on the bottom side of the portable information terminal 1 to thereby give an instruction to perform printing.

As described above, in the portable information terminal 1, both an instruction for switching the data of interest and an instruction for performing processing on the data of interest are given without touch input.

A technique that enables both an instruction for switching the data of interest and an instruction for performing processing on the data of interest to be given without touch input will be described below.

Figure 3:
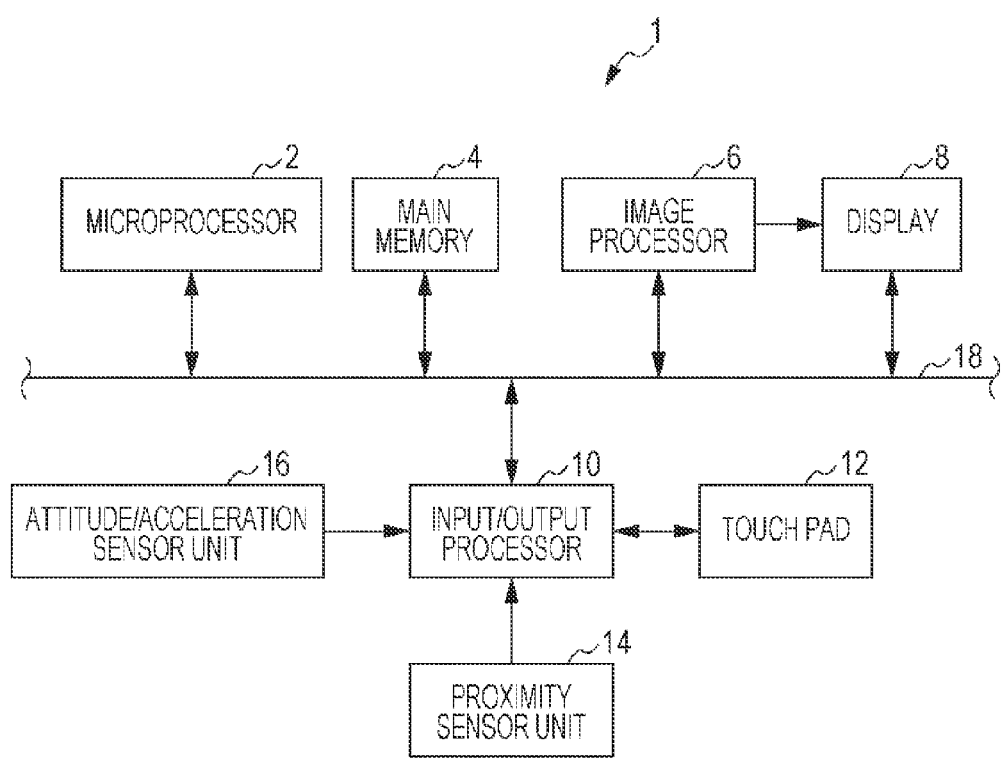
FIG. 3 is a diagram illustrating a hardware configuration of the portable information terminal.

FIG. 3 is a diagram illustrating an example of a hardware configuration of the portable information terminal 1. As illustrated in FIG. 3, the portable information terminal 1 includes a bus 18, a microprocessor 2, a main memory 4, an image processor 6, a display 8, an input/output processor 10, a touch pad 12, a proximity sensor unit 14, and an attitude/acceleration sensor unit 16. The touch panel 20 is constituted by the display 8 and the touch pad 12.

The bus 18 is used to exchange addresses and data among the components of the portable information terminal 1. The microprocessor 2, the main memory 4, the image processor 6, and the input/output processor 10 are connected to one another by the bus 18 so that data communication is enabled among them.

The microprocessor 2 controls the components by using an operating system stored in a read only memory (ROM), which is not illustrated, and an application program stored in an auxiliary memory, which is not illustrated. The main memory 4 includes a random access memory (RAM), for example, into which an application program is written as necessary. The main memory 4 is also used as a work space of the microprocessor 2. The application program may be read from a computer readable information storage medium, such as a compact disc read-only memory (CD-ROM) or a digital versatile disc read-only memory (DVD-ROM), and may be fed to the portable information terminal 1. Alternatively, the application program may be received from a network, such as the Internet, and may be fed to the portable information terminal 1.

The display 8 is a commonly used display, such as a liquid crystal display or an organic electroluminescence (EL) display. The image processor 6 makes the display 8 display and output image data of a screen generated by the microprocessor 2, at a certain timing.

The input/output processor 10 is an interface used by the microprocessor 2 to access the touch pad 12, the proximity sensor unit 14, and the attitude/acceleration sensor unit 16. The touch pad 12, the proximity sensor unit 14, and the attitude/acceleration sensor unit 16 are electrically connected to the input/output processor 10.

The touch pad 12 is a touch pad that detects the touch position by using a well known method, such as a capacitive coupling method or a pressure sensing method, and is an operation unit used by a user to perform touch input. The touch pad 12 acquires the position coordinates that indicate the position (that is, the touch position) on the touch panel 20 on which a user touches, and feeds the position coordinates to the microprocessor 2.

The proximity sensor unit 14 includes a proximity sensor, makes an attempt, at a certain time interval, to sense a proximity object, and feeds the sensing result to the microprocessor 2. Here, a proximity object is an object that comes or exists within a distance from the proximity sensor unit 14 or an apparatus including the proximity sensor unit 14, the distance being determined in accordance with the sensing capability of the sensor, or within a predetermined distance.

The attitude/acceleration sensor unit 16 includes an acceleration sensor and a gyro sensor, senses the attitude and acceleration of the portable information terminal 1 at a certain time interval, and feeds the attitude sensing result and the acceleration sensing result to the microprocessor 2. The attitude sensing result may be any information. In this exemplary embodiment, an attitude vector θ is fed as the attitude sensing result. An attitude vector θ includes the pitch angle of the portable information terminal 1 from its basic attitude, the rolling angle of the portable information terminal 1 from its basic attitude, and the yaw angle of the portable information terminal 1 from its basic attitude. Here, the attitude of the portable information terminal 1 illustrated in FIG. 2A is assumed to be the basic attitude of the portable information terminal 1. Note that pitching is rotation about the X axis, rolling is rotation about the Z axis, and yawing is rotation about the Y axis.

The acceleration sensing result may be any information. In this exemplary embodiment, an acceleration vector a is fed as the acceleration sensing result. An acceleration vector a includes the acceleration of the portable information terminal 1 in the X-axis direction, the acceleration of the portable information terminal 1 in the Y-axis direction, and the acceleration of the portable information terminal 1 in the Z-axis direction.

FIG. 4 is a functional block diagram illustrating functional groups implemented by the portable information terminal 1. As illustrated in FIG. 4, a sensing result acquisition unit 25, a proximity sensing unit 26, a data-of-interest identification information memory 28, a switching condition memory 30, a switching unit 32, a performing condition memory 34, a processing performing unit 36, an operation guiding unit 38, and a condition setting unit 40 are implemented. The sensing result acquisition unit 25, the proximity sensing unit 26, the switching unit 32, the processing performing unit 36, the operation guiding unit 38, and the condition setting unit 40 are implemented by the microprocessor 2 executing the application program stored in the main memory 4. In this exemplary embodiment, the data-of-interest identification information memory 28, the switching condition memory 30, and the performing condition memory 34 are implemented by using the main memory 4.

The sensing result acquisition unit 25 acquires the attitude sensing result relating to the portable information terminal 1 and the acceleration sensing result relating to the portable information terminal 1, as the result of detection of the state of the portable information terminal 1. In this exemplary embodiment, the sensing result acquisition unit 25 acquires the acceleration vector a and the attitude vector θ from the attitude/acceleration sensor unit 16.

The proximity sensing unit 26 senses a proximity object (here, a hand). In this exemplary embodiment, the proximity sensing unit 26 senses a proximity object on the basis of the sensing result fed from the proximity sensor unit 14.

The data-of-interest identification information memory 28 stores data-of-interest identification information used to identify the data of interest currently selected from among plural pieces of data. In this exemplary embodiment, each piece of document data displayed on the data list screen corresponds to a piece of "data".

The switching condition memory 30 stores switching conditions set in advance. The switching conditions are conditions to be satisfied when switching the data of interest. In this exemplary embodiment, four switching conditions respectively set for four switching methods are stored. Specifically, the switching condition memory 30 stores a switching condition table that stores the switching conditions set for the respective switching methods, by associating each of the switching conditions with a corresponding one of the switching methods. FIG. 5 is a diagram illustrating an example of the switching condition table. As illustrated in FIG. 5, the switching condition table stores the switching conditions set for the respective switching methods by associating the switching conditions with switching methods A to D respectively. Here, the switching method A is a method of switching the data of interest to the piece of document data located on the immediate right of the current data of interest. The switching method B is a method of switching the data of interest to the piece of document data located on the immediate left of the current data of interest. The switching method C is a method of switching the data of interest to the piece of document data located right above the current data of interest. The switching method D is a method of switching the data of interest to the piece of document data located right below the current data of interest.

Here, as a switching condition corresponding to the switching method A, a condition A is stored. The condition A specifies that "the pattern of changes in the attitude vector θ is similar to a predetermined pattern A to at least a certain degree", and is set so as to be satisfied when the portable information terminal 1 is inclined by a user to the right to at least a certain degree. As a switching condition corresponding to the switching method B, a condition B is stored. The condition B specifies that "the pattern of changes in the attitude vector θ is similar to a predetermined pattern B to at least a certain degree", and is set so as to be satisfied when the portable information terminal 1 is inclined by a user to the left to at least a certain degree. As a switching condition corresponding to the switching method C, a condition C is stored. The condition C specifies that "the pattern of changes in the attitude vector θ is similar to a predetermined pattern C to at least a certain degree", and is set so as to be satisfied when the portable information terminal 1 is inclined by a user backward to at least a certain degree. As a switching condition corresponding to the switching method D, a condition D is stored. The condition D specifies that "the pattern of changes in the attitude vector θ is similar to a predetermined pattern D to at least a certain degree", and is set so as to be satisfied when the portable information terminal 1 is inclined by a user forward to at least a certain degree.

The switching unit 32 determines whether at least one of the attitude sensing result and the acceleration sensing result acquired by the sensing result acquisition unit 25 satisfies any of the switching conditions stored in the switching condition memory 30. The sensing result to be used for the determination depends on switching conditions to be used. In this exemplary embodiment, it is assumed that switching conditions to be used are conditions relating to the attitude sensing result. Therefore, the switching unit 32 determines whether the attitude sensing result (that is, the attitude vector θ) satisfies any of the switching conditions.

If at least one of the attitude sensing result and the acceleration sensing result satisfies any of the switching conditions, the switching unit 32 switches the data of interest. The switching unit 32 updates the data-of-interest identification information, and moves the indicator 22 to the current data of interest after switching. That is, the switching unit 32 switches the state of a piece of data, the piece of data being in a selected state, from the selected state to an unselected state, and switches the state of another piece of data, the other piece of data being in the unselected state, from the unselected state to the selected state. In this exemplary embodiment, if at least one of the attitude sensing result and the acceleration sensing result satisfies any of the switching conditions, the switching unit 32 switches the data of interest by using a method for which the switching condition that the at least one of the results satisfies is set. The image processor 6 performs control so as to display a piece of data in the selected state on the touch panel 20 such that the piece of data in the selected state is distinguishable from a piece of data in the unselected state.

In this exemplary embodiment, in the case where a proximity object has been sensed by the proximity sensing unit 26, the switching unit 32 stops performing the above-described determination.

The performing condition memory 34 stores performing conditions set in advance. The performing conditions are conditions to be satisfied when performing processing on the data of interest, such as printing, display, or deletion. In this exemplary embodiment, three performing conditions respectively set for three pieces of processing including printing, display, and deletion are stored. Specifically, the performing condition memory 34 stores a performing condition table that stores performing conditions set for the respective pieces of processing, by associating each of the performing conditions with a corresponding one of the pieces of processing. FIG. 6 is a diagram illustrating an example of the performing condition table. As illustrated in FIG. 6, the performing condition table stores the performing conditions set for the respective pieces of processing by associating the performing conditions with processing A (printing), processing B (display), and processing C (deletion) respectively.

Here, as a performing condition corresponding to the processing A, a condition E is stored. The condition E specifies that "the pattern of changes in the acceleration vector a is similar to a predetermined pattern E to at least a certain degree", and is set so as to be satisfied when the portable information terminal 1 is tapped by a user once on the bottom side. As a performing condition corresponding to the processing B, a condition F is stored. The condition F specifies that "the pattern of changes in the acceleration vector a is similar to a predetermined pattern F to at least a certain degree", and is set so as to be satisfied when the portable information terminal 1 is tapped by a user once on the right side. As a performing condition corresponding to the processing C, a condition G is stored. The condition G specifies that "the pattern of changes in the acceleration vector a is similar to a predetermined pattern G to at least a certain degree", and is set so as to be satisfied when the portable information terminal 1 is tapped by a user twice on the right side.

The processing performing unit 36 determines whether at least one of the attitude sensing result and the acceleration sensing result acquired by the sensing result acquisition unit 25 satisfies any of the performing conditions stored in the performing condition memory 34. In this exemplary embodiment, the processing performing unit 36 starts to perform determination when a proximity object (here, a hand) has been sensed by the proximity sensing unit 26. The sensing result to be used for the determination depends on performing conditions to be used. In this exemplary embodiment, it is assumed that the performing conditions to be used are conditions relating to the acceleration sensing result. Therefore, the processing performing unit 36 determines whether the acceleration sensing result (that is, the acceleration vector a) satisfies any of the performing conditions.

If at least one of the attitude sensing result and the acceleration sensing result satisfies any of the performing conditions, the processing performing unit 36 performs, on the data of interest, processing (printout of the data of interest, display of an object represented by the data of interest, deletion of the data of interest, or the like) corresponding to the satisfied performing condition. In this exemplary embodiment, if at least one of the attitude sensing result and the acceleration sensing result satisfies any of the performing conditions, the processing performing unit 36 performs processing with which the performing condition that the at least one of the results satisfies is associated.

In the case where a proximity object has been sensed by the proximity sensing unit 26, the operation guiding unit 38 gives guidance on operations for satisfying the respective performing conditions. In this exemplary embodiment, the operation guiding unit 38 makes the display 8 display the guidance image 24 on the basis of the performing condition table to thereby give guidance on operations for satisfying the performing conditions and the types of processing with which the performing conditions are associated, by using an image (see FIG. 2D).

In the case where none of the performing conditions is satisfied, the operation guiding unit 38 stops displaying the guidance image 24 and stops giving the guidance.

The condition setting unit 40 sets operations to be performed by a user in order to give an instruction to switch the data of interest. That is, the condition setting unit 40 sets the switching conditions for the respective switching methods (see FIG. 5). The condition setting unit 40 sets operations to be performed by a user in order to give an instruction to perform processing on the data of interest. That is, the condition setting unit 40 sets the performing conditions for the respective pieces of processing (see FIG. 6).

Here, as an operation for giving an instruction to switch the data of interest, an operation of inclining the portable information terminal 1 is employed. However, any operation may be employed as long as the operation is an operation of moving the portable information terminal 1. For example, an operation of tapping on the portable information terminal 1 may be employed. That is, the switching conditions may be of any design as long as the switching conditions relate to at least one of the attitude sensing result and the acceleration sensing result. The switching methods A to D described above are merely examples and any switching method may be employed.

Here, as an operation for giving an instruction to perform processing, an operation of tapping on the portable information terminal 1 is employed. However, any operation may be employed as long as the operation is an operation of moving the portable information terminal 1. For example, an operation of inclining the portable information terminal 1 may be employed. That is, the performing conditions may be of any design as long as the performing conditions relate to at least one of the attitude sensing result and the acceleration sensing result. The pieces of processing A to C described above are merely examples and any processing (for example, copying of the data of interest) may be employed.

Figure 7:
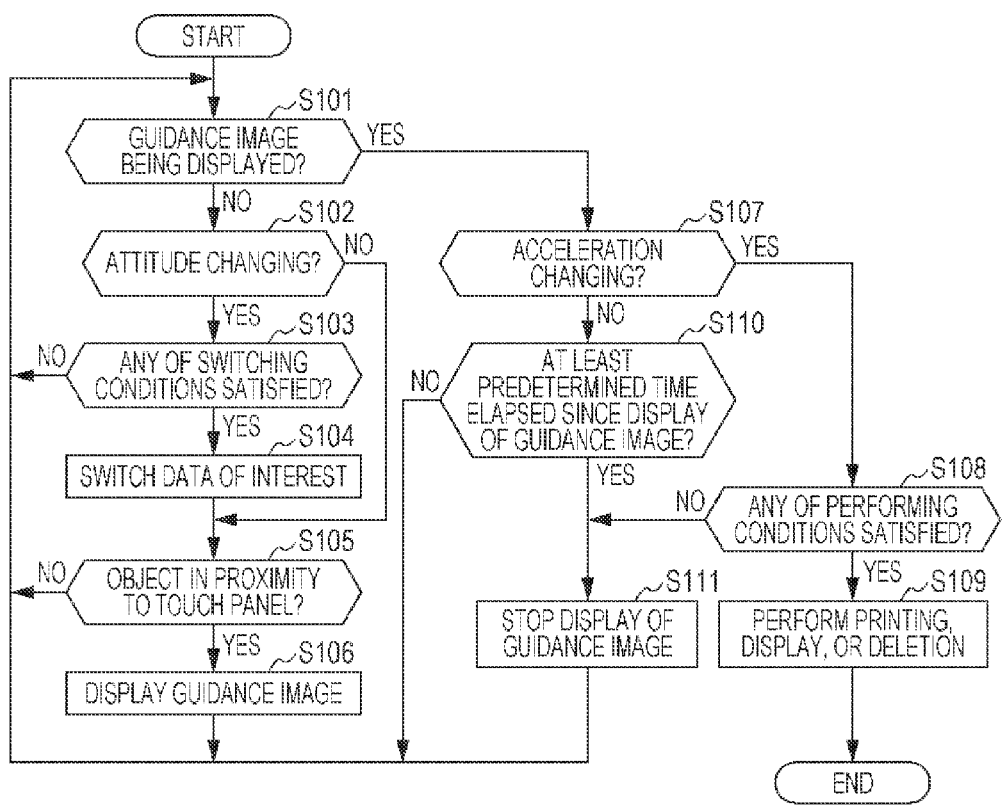
FIG. 7 is a flowchart illustrating an example of processing performed by the portable information terminal.

FIG. 7 is a flowchart illustrating an example of processing performed by the portable information terminal 1. In this exemplary embodiment, the processing illustrated in FIG. 7 is performed while the data list screen is displayed.

First, the microprocessor 2 determines whether or not the guidance image 24 is being displayed (step S101). In this exemplary embodiment, display state data indicating whether or not the guidance image 24 is being displayed is stored in the main memory 4. The microprocessor 2 determines whether or not the guidance image 24 is being displayed on the basis of the display state data.

If the guidance image 24 is not being displayed (No in step S101), the microprocessor 2 determines whether or not the attitude of the portable information terminal 1 is changing (step S102). In this exemplary embodiment, the attitude vectors θ that have been fed by the attitude/acceleration sensor unit 16 during a period from a certain point in the past until the present time are stored in the main memory 4 in chronological order. The microprocessor 2 determines whether or not the attitude of the portable information terminal 1 is changing by comparing the latest attitude vector θ with the previous attitude vector θ, for example.

If the attitude of the portable information terminal 1 is changing (Yes in step S102), the microprocessor 2 determines whether or not the attitude vectors θ stored in chronological order satisfy any of the switching conditions stored in the switching condition table (step S103). That is, the microprocessor 2 determines whether or not the portable information terminal 1 has been inclined to the right, to the left, backward, or forward to at least a certain degree. For example, in the case where it is determined whether or not the attitude vectors θ stored in chronological order satisfy the switching condition set for the switching method A (see FIG. 5), the microprocessor 2 calculates a value that represents the similarity between the pattern of changes in the attitude vectors θ stored in chronological order and the pattern A, and determines whether or not the similarity between the patterns is equal to or greater than a certain degree on the basis of the calculated value.

If the attitude vectors θ stored in chronological order satisfy any of the switching conditions (Yes in step S103), the microprocessor 2 switches the data of interest by using the switching method with which the satisfied switching condition is associated (step S104). That is, the microprocessor 2 updates the data-of-interest identification information and moves the indicator 22 to the current data of interest after switching.

The microprocessor 2 thereafter determines whether or not an object (for example, a hand) is in proximity to the touch panel 20 on the basis of the sensing result fed from the proximity sensor unit 14 (step S105). That is, the microprocessor 2 determines whether or not a proximity object (hand) is present. Note that step S105 is performed even if the attitude of the portable information terminal 1 is not changing (No in step S102).

If a proximity object is present (Yes in step S105), the microprocessor 2 makes the display 8 display the guidance image 24 (see FIG. 2D) on the basis of the performing condition table (step S106). The microprocessor 2 thereafter repeats step S101 and the subsequent steps. If the attitude vectors θ stored in chronological order do not satisfy any of the switching conditions (No in step S103) or if a proximity object is not present (No in step S105), the microprocessor 2 repeats step S101 and the subsequent steps.

On the other hand, if the guidance image 24 is being displayed (Yes in step S101), the microprocessor 2 determines whether or not the acceleration of the portable information terminal 1 is changing (step S107). In this exemplary embodiment, the acceleration vectors a that have been fed by the attitude/acceleration sensor unit 16 during a period from a certain point in the past until the present time are stored in the main memory 4 in chronological order. The microprocessor 2 determines whether or not the acceleration of the portable information terminal 1 is changing by comparing the magnitude of the latest acceleration vector a with the previous acceleration vector a, for example.

If the acceleration of the portable information terminal 1 is changing (Yes in step S107), the microprocessor 2 determines whether or not the acceleration vectors a stored in chronological order satisfy any of the performing conditions stored in the performing condition table (step S108). That is, the microprocessor 2 determines whether the portable information terminal 1 has been tapped once on the right side, the portable information terminal 1 has been tapped once on the bottom side, or the portable information terminal 1 has been tapped twice on the right side. For example, in the case where it is determined whether or not the acceleration vectors a stored in chronological order satisfy the performing condition set for the processing A (see FIG. 6), the microprocessor 2 calculates a value that represents the similarity between the pattern of changes in the acceleration vectors a stored in chronological order and the pattern E, and determines whether or not the similarity between the patterns is equal to or greater than a certain degree on the basis of the calculated value.

If the acceleration vectors a stored in chronological order satisfy any of the performing conditions (Yes in step S108), the microprocessor 2 performs processing with which the satisfied performing condition is associated (step S109). That is, the microprocessor 2 performs processing, among printing of the data of interest, display of a document represented by the data of interest, and deletion of the data of interest, in accordance with a user's instruction. Then, the entire processing ends.

On the other hand, if the acceleration of the portable information terminal 1 is not changing (No in step S107), the microprocessor 2 determines whether or not at least a predetermined time has elapsed since the start of display of the guidance image 24 (step S110).

If at least the predetermined time has elapsed since the start of display of the guidance image 24 (Yes in step S110), the microprocessor 2 stops display of the guidance image 24 (step S111). Note that step S111 is also performed in the case where an operation other than an operation of tapping once or twice on the right side and an operation of tapping once on the bottom side is performed, that is, in the case where the acceleration vectors a stored in chronological order do not satisfy any of the performing conditions (No in step S108).

After the microprocessor 2 has performed step S111, the microprocessor 2 repeats step S101 and the subsequent steps. Note that the microprocessors 2 also repeats step S101 and the subsequent steps in the case where the time elapsed since the start of display of the guidance image 24 is less than the predetermined time (No in step S110).

Note that an exemplary embodiment of the present invention is not limited to the above-described embodiment.

For example, a user (for example, a worker working in a work site) may perform touch input when the user is able to perform touch input to thereby set in advance operations to be performed in order to give instructions for printing, display, and deletion. That is, the condition setting unit 40 may set performing conditions to be associated with the pieces of processing on the basis of touch positions detected by the touch pad 12. For example, a user may perform control on his/her own so as to allow an instruction for performing processing to be given in response to an operation of the user's choice, or so as not to allow an instruction for deletion to be given unless a more complicated operation is performed for deletion than other processing. Note that a user may set in advance an operation for switching the data of interest, by performing touch input. That is, the condition setting unit 40 may set switching conditions to be associated with the switching methods, on the basis of touch positions. For example, a user may perform control on his/her own so as to make an operation for giving an instruction to perform processing more difficult than an operation for switching the data of interest.

For example, the condition setting unit 40 may randomly set an operation to be performed by a user in order to give an instruction to perform processing on the data of interest. That is, the condition setting unit 40 may randomly set performing conditions. For example, if an object is in proximity to the touch panel 20 (Yes in step S105) in the flow illustrated in FIG. 7, the microprocessor 2 may set performing conditions to be associated with the pieces of processing using random numbers before step S106. For example, the microprocessor 2 may determine which of the conditions E, F, and G (see FIG. 6) is associated with which of the pieces of processing as a performing condition, by using random numbers. In this case, an operation to be performed by a user in order to give an instruction to perform each of the pieces of processing changes each time an operation is to be performed. In this way, it is possible to give a further reminder to a user so as to make sure that an operation for giving an instruction to perform processing will not be performed by mistake.

For example, user attribute information indicating the attribute (for example, a user's dominant hand) of a user may be stored in the portable information terminal 1, and the condition setting unit 40 may set an operation to be performed by a user in order to give an instruction to perform processing on the data of interest, on the basis of the user attribute information. That is, the condition setting unit 40 may set performing conditions to be associated with the pieces of processing, on the basis of user attribute information. In this case, an operation to be performed by a user in order to give an instruction to perform processing is controlled in accordance with the attribute of the user. For example, control is performed so that a user (for example, a right-handed user) is not requested to perform an operation (for example, tapping on the left side) which the user may be uncomfortable with.

For example, data attribute information indicating the attribute (for example, an importance level) of the data of interest may be stored in the portable information terminal 1, and the condition setting unit 40 may set an operation to be performed by a user in order to give an instruction to perform processing on the data of interest, on the basis of the data attribute information. That is, the condition setting unit 40 may set performing conditions to be associated with the pieces of processing, on the basis of data attribute information. In this case, an operation to be performed by a user in order to give an instruction to perform processing is controlled in accordance with the attribute of the data of interest. For example, control is performed so that a more complicated operation is requested for deletion of the data of interest having a higher importance level than other processing.

For example, the microprocessor 2 may display a message used to confirm a user's intention on the display 8 when an instruction to perform specific processing (for example, deletion) has been given by the user.

Furthermore, the sensitivity in sensing an attitude or acceleration may be adjusted by changing the setting of the switching conditions or performing conditions.

"Data" that may be selected by a user is not limited to document data. That is, "data" that may be selected by a user may be data other than document data. The switching methods, switching conditions, processing, and performing conditions may be designed as appropriate in accordance with the characteristics of "data" that may be selected by a user. For example, the switching methods and switching conditions may be designed so that, in the case where a piece of page data to be displayed on a screen is selected from document data containing plural pieces of page data, a piece of page data (corresponding to the data of interest) displayed on a screen is switched to the next piece of page data by tapping once on the right side, and is switched to the previous piece of page data by tapping once on the left side. For example, the switching methods and switching conditions may be designed so that the piece of page data displayed on a screen is switched to the last piece of page data by tapping twice on the right side, and is switched to the first piece of page data by tapping twice on the left side. Furthermore, the processing and performing conditions may be designed so that printing of a piece of page data displayed on a screen is performed by tapping once on the bottom side, for example.

When a user taps on the portable information terminal 1, the user's hand is close to the portable information terminal 1. Accordingly, the performing conditions may be set on the basis of conditions (for example, the conditions E to G in FIG. 6) relating to at least one of the attitude sensing result and the acceleration sensing result and a condition relating to the sensing result from the proximity sensor unit 14. For example, the performing condition corresponding to the processing A illustrated in FIG. 6 may be set on the basis of the condition E and the condition (hereinafter referred to as a proximity condition) specifying that "a proximity object is present", the performing condition corresponding to the processing B may be set on the basis of the condition F and the proximity condition, and the performing condition corresponding to the processing C may be set on the basis of the condition G and the proximity condition. Accuracy of determination as to whether or not an instruction to perform processing is given may be increased with such setting. In this case, the processing performing unit 36 determines whether or not the performing condition is satisfied on the basis of at least one of the attitude sensing result and the acceleration sensing result, and the sensing result from the proximity sensor unit 14.

Alternatively, the performing conditions may be set only on the basis of a condition relating to the sensing result from the proximity sensor unit 14. For example, a condition specifying that "a proximity object is present" may be stored in the performing condition memory 34 as a performing condition. In this case, the processing performing unit 36 determines whether or not the sensing result from the proximity sensor unit 14 satisfies the performing condition. If it is determined that the sensing result from the proximity sensor unit 14 satisfies the performing condition, processing (for example, printing, display, or deletion) corresponding to the performing condition will be performed on the data of interest.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a process, the process comprising:
   switching, in response to at least one of an attitude sensing result and an acceleration sensing result relating to a portable information terminal satisfying a predetermined switching condition, data of interest to a corresponding piece of data among a plurality of pieces of data, the portable information terminal including a touch panel; and
   performing, on the data of interest, in response to at least one of the attitude sensing result and the acceleration sensing result relating to the portable information terminal satisfying a predetermined performing condition of a plurality of performing conditions, processing corresponding to the predetermined performing condition, wherein:
   the switching comprises stopping determination as to whether or not the switching condition is satisfied in response to a proximity object being sensed, and the performing of processing comprises starting determination as to whether or not the performing condition is satisfied in response to a proximity object being sensed.

2. A non-transitory computer readable medium storing a program causing a computer to execute a process, the process comprising:

switching, in response to at least one of an attitude sensing result and an acceleration sensing result relating to a portable information terminal satisfying a predetermined switching condition, data of interest to a corresponding piece of data among a plurality of pieces of data, the portable information terminal including a touch panel; and performing, on the data of interest, in response to at least one of the attitude sensing result and the acceleration sensing result relating to the portable information terminal satisfying a predetermined performing condition of a plurality of performing conditions, processing corresponding to the predetermined performing condition, wherein the switching comprises stopping determination as to whether or not the switching condition is satisfied in response to a proximity object being sensed, and the performing of the processing comprises starting determination as to whether or not the performing condition is satisfied in response to tapping once or twice on the predetermined side of the portable information terminal.

3. The non-transitory computer readable medium according to claim 1, the process further comprises setting the performing condition randomly.

4. The non-transitory computer readable medium according to claim 1, wherein the performing of processing comprises performing, in response to the at least one of the attitude sensing result and the acceleration sensing result relating to the portable information terminal satisfying at least one of the performing conditions, processing corresponding to the performing condition that the at least one of the sensing results satisfies, and wherein the process further comprises setting the performing conditions in accordance with a result of detection of a position on the touch panel touched by a user.

5. The non-transitory computer readable medium according to claim 1, wherein:

the performing of processing comprises performing, in response to the at least one of the attitude sensing result and the acceleration sensing result relating to the portable information terminal satisfying at least one of the performing conditions, processing corresponding to the performing condition that the at least one of the sensing results satisfies, and the process further comprises setting the performing conditions in accordance with a result of detection of a position on the touch panel touched by a user.

6. The non-transitory computer readable medium according to claim 1, wherein the process further comprises:

setting the switching condition in accordance with a result of detection of a position on the touch panel touched by a user; and setting the performing condition in accordance with a result of detection of a position on the touch panel touched by a user.

7. The non-transitory computer readable medium according to claim 1, wherein the process further comprises:

setting the switching condition in accordance with a result of detection of a position on the touch panel touched by a user; and setting the performing condition in accordance with a result of detection of a position on the touch panel touched by a user.

8. The non-transitory computer readable medium according to claim 1, wherein the plurality of processes comprise at least one of printing the corresponding piece of data, displaying the corresponding piece of data and deleting the corresponding piece of data.

9. The non-transitory computer readable medium according to claim 2, wherein the process further comprises setting the performing condition randomly.

10. The non-transitory computer readable medium according to claim 2, wherein the performing of processing comprises performing, in response to the at least one of the attitude sensing result and the acceleration sensing result relating to the portable information terminal satisfying at least one of the performing conditions, processing corresponding to the performing condition that the at least one of the sensing results satisfies, and wherein the process further comprises setting the performing conditions in accordance with a result of detection of a position on the touch panel touched by a user.

11. The non-transitory computer readable medium according to claim 2, wherein:

the performing of processing comprises performing, in response to the at least one of the attitude sensing result and the acceleration sensing result relating to the portable information terminal satisfying at least one of the performing conditions, processing corresponding to the performing condition that the at least one of the sensing results satisfies, and the process further comprises setting the performing conditions in accordance with a result of detection of a position on the touch panel touched by a user.

12. The non-transitory computer readable medium according to claim 2, wherein the process further comprises:

setting the switching condition in accordance with a result of detection of a position on the touch panel touched by a user; and setting the performing condition in accordance with a result of detection of a position on the touch panel touched by a user.

13. The non-transitory computer readable medium according to claim 2, wherein the process further comprising:

setting the switching condition in accordance with a result of detection of a position on the touch panel touched by a user; and setting the performing condition in accordance with a result of detection of a position on the touch panel touched by a user.

14. The non-transitory computer readable medium according to claim 2, wherein the plurality of processes comprise at least one of printing the corresponding piece of data, displaying the corresponding piece of data and deleting the corresponding piece of data.

* * * * *